(12) United States Patent
Sauvlet et al.

(10) Patent No.: US 7,866,424 B2
(45) Date of Patent: Jan. 11, 2011

(54) HYBRID VEHICLE

(75) Inventors: Nils Sauvlet, Gerlingen (DE); Thomas Rauner, Blaubeuren (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 199 days.

(21) Appl. No.: 12/014,523

(22) Filed: Jan. 15, 2008

(65) Prior Publication Data

US 2008/0179121 A1 Jul. 31, 2008

(30) Foreign Application Priority Data

Jan. 16, 2007 (DE) ........................ 10 2007 002 188

(51) Int. Cl.
*B60K 6/20* (2007.10)

(52) U.S. Cl. ............ 180/65.21; 180/65.28; 180/65.275; 180/69.4; 123/447

(58) Field of Classification Search ................ 180/65.2, 180/65.28, 65.21, 69.4, 65.275; 123/457, 123/478, 578, 445, 446, 447; 903/930
See application file for complete search history.

(56) References Cited

U.S. PATENT DOCUMENTS

| | | | |
|---|---|---|---|
| 5,572,981 A | | 11/1996 | Pfleger et al. |
| 5,680,849 A | * | 10/1997 | Morikawa et al. ............ 123/520 |
| 6,067,967 A | | 5/2000 | Kidokoro et al. |
| 6,478,849 B1 | | 11/2002 | Taylor et al. |
| 6,557,534 B2 | | 5/2003 | Robichaux et al. |
| 7,107,971 B2 | * | 9/2006 | Spink et al. .................. 123/520 |
| 2002/0162457 A1 | | 11/2002 | Hyodo et al. |
| 2006/0053868 A1 | * | 3/2006 | Chung et al. .................. 73/49.7 |
| 2006/0174698 A1 | | 8/2006 | Chung et al. |
| 2007/0209618 A1 | * | 9/2007 | Leone ..................... 123/90.12 |
| 2008/0142097 A1 | * | 6/2008 | Rumpf .................. 137/565.23 |
| 2008/0195296 A1 | * | 8/2008 | Grunwald et al. ........... 701/104 |
| 2009/0150046 A1 | * | 6/2009 | Achleitner et al. .......... 701/103 |
| 2009/0194042 A1 | * | 8/2009 | Workman et al. ............... 123/3 |
| 2010/0000496 A1 | * | 1/2010 | Bretl et al. .................. 123/447 |

FOREIGN PATENT DOCUMENTS

| | | |
|---|---|---|
| DE | 4427688 | 2/1996 |
| DE | 198 53 573 A1 | 5/2000 |
| DE | 10200016 | 10/2002 |
| DE | 10 2004 027 631 A1 | 1/2006 |
| DE | 10 2005 041 758 A1 | 4/2006 |
| EP | 0 698 522 A1 | 2/1996 |

OTHER PUBLICATIONS

German Office Action dated Jan. 21, 2008 including English translation (Nine (9) pages).

* cited by examiner

*Primary Examiner*—Lesley Morris
*Assistant Examiner*—Tashiana Adams
(74) *Attorney, Agent, or Firm*—Gerald E. Hespos; Michael J. Porco

(57) ABSTRACT

A hybrid vehicle with an internal-combustion engine and an electric motor has a tank ventilation system that includes a fuel tank and a suction pipe leading from a filtering device, which can be regenerated, to the intake path of the internal-combustion engine. A control device is configured to actuate different valve devices for flushing the filtering device, so that ambient air can be fed to the internal-combustion engine through the filtering device and the suction pipe. In addition, the control device is configured such that, during purely electric operation of the hybrid vehicle, it connects the internal-combustion engine as a function of the loading condition of the filtering device or of the flushing gas concentration.

19 Claims, 3 Drawing Sheets

HYBRID VEHICLE

BACKGROUND AND SUMMARY OF THE INVENTION

This application claims the priority of German patent document 10 2007002188.9-51, filed Jan. 16, 2007, the disclosure of which is expressly incorporated by reference herein.

The present invention relates to a hybrid vehicle having an internal-combustion engine and an electric motor.

To comply with the increasingly stricter environmental laws, motor vehicles are currently normally equipped with a filtering device which is arranged in a fuel tank ventilator pipe. This filtering device, which preferably has activated carbon as the filtering material, filters hydrocarbons out of a tank ventilation current, so that no hydrocarbons (or only a very small amount of hydrocarbons) reach the environment. However, if the filtering material is saturated, no additional hydrocarbons can be absorbed, and the filtering device loses its effect. In order to keep the filtering device operational for a long period of time, the latter is flushed from time to time and the filtering material is thereby regenerated.

The flushing current for regenerating the filtering material is fed to an intake path of the internal-combustion engine, so that the hydrocarbons flushed out of the filtering material can be burnt in the internal-combustion engine in a manner protecting the environment. However, in the case of motor vehicles having a hybrid drive, it is problematic that the internal combustion engine does not operate continuously but is switched off, particularly during a purely electromotive drive. In the switched-off condition, the hydrocarbons flushed out of the filtering device into the intake path cannot be burned, and this concept is therefore suboptimal in the case of hybrid vehicles.

One object of the present invention is to provide a different or improved filtering arrangement for a hybrid vehicle which is distinguished particularly by a lower pollutant emission.

This and other objects and advantages are achieved by the hybrid vehicle and filtering apparatus according to the invention, which is based on the general idea of providing a hybrid vehicle (having an internal-combustion engine, an electric motor as well as a tank ventilation system) with a control device that starts the internal-combustion engine when there is a simultaneous requirement to flush or regenerate the filtering device during a purely electromotive drive of the hybrid vehicle. As a result, the hydrocarbons flushed back from the filtering device are fed to the combustion in the internal-combustion engine.

The filtering device is arranged in a tank ventilation pipe, which leads from a tank into the environment and can be shut off by means of a valve device arranged in the suction pipe between the filtering device and an intake path of the internal-combustion engine. If a filtering material of the filtering device is saturated with hydrocarbons, the control device for flushing the filtering device actuates the valve device and thereby permits the above-mentioned feeding of hydrocarbons present in the pipes and in the filtering device to the internal-combustion engine.

Combustion of the hydrocarbons present in the pipe or in the filtering device can of course take place only when the internal-combustion engine is running at least in the standing gas-driven condition. However, in the case of hybrid-operated motor vehicles, the internal-combustion engine is switched off during an electromotive drive condition. Thus, the control device according to the invention is constructed such that, in the electric operation of the hybrid vehicle, it switches on or connects the internal-combustion engine as a function of a loading condition of the filtering device. Thus, if the hybrid vehicle is operated electrically and, for example, a sensor detects that the filtering material is saturated with hydrocarbons, the control device will, on the one hand, open the valve device in the suction pipe and in the tank ventilation pipe and, on the other hand, start the internal-combustion engine which will then burn the hydrocarbons fed to it. In this manner, hydrocarbon emission (and thus pollutant emissions) can therefore clearly be reduced in the case of hybrid-operated motor vehicles.

According to another feature of the invention, a vacuum accumulator is provided in the intake path of the internal combustion engine. When the valve devices are open, the vacuum accumulator permits flushing of the filtering device, even when the internal-combustion engine is switched off. This vacuum accumulator preferably contains a vacuum volume sufficient for flushing the filtering device and can be opened as required. This can also take place in the purely electromotive operating condition of the hybrid vehicle, in which then the control device, on the one side, opens the valve device in the suction pipe and in the tank ventilation pipe and, on the other side, in a communicating manner, connects the vacuum accumulator with an intake path of the internal-combustion engine. As a result of the vacuum existing in the vacuum accumulator, the hydrocarbons are taken in from the suction pipe and from the filtering material of the filtering device and are stored in the intake path or in the vacuum accumulator until the internal-combustion engine is started. When the internal-combustion engine is started in a later operating condition, the hydrocarbons stored in the vacuum accumulator and in the intake path can be fed to the combustion process in the internal-combustion engine. This variant permits flushing or a regeneration of the filtering material present in the filtering device even when the internal-combustion engine is switched off.

In an advantageous further embodiment of the invention, a valve is arranged between the filtering device, on the one side, and the fuel tank on the other side, and also a pumping device is provided which can admit pressure to the fuel tank when the valve device is closed. In addition, a sensor device is provided which can detect a hydrocarbon concentration and/or a pressure in the fuel tank. By means of these devices, a leak test of the fuel tank can be carried out by closing the valve device and admitting pressure to the fuel tank by means of the pumping device. After switching-off the pumping device, the sensor device determines a pressure drop as a function of time, and can draw a conclusion on the tightness of the tank system by way of the thus determined value.

Simultaneously, the admission of pressure to the fuel tank has the important advantage that a transition from a liquid to a gaseous condition of the fuel is made difficult and, as a result, the fuel will clearly evaporate less rapidly. It would therefore be possible to pressurize the fuel tank during a purely electromotive drive and thereby make a gassing-out of hydrocarbons from the fuel at least difficult.

It is understood that the above-mentioned characteristics and the characteristics to be explained in the following can be used not only in the respective indicated combination but also in other combinations or alone without leaving the scope of the present invention.

BRIEF DESCRIPTION OF THE DRAWINGS

Preferred embodiments of the invention are illustrated in the drawings and will be explained in detail in the follow

DETAILED DESCRIPTION OF THE DRAWINGS

Figure 1:
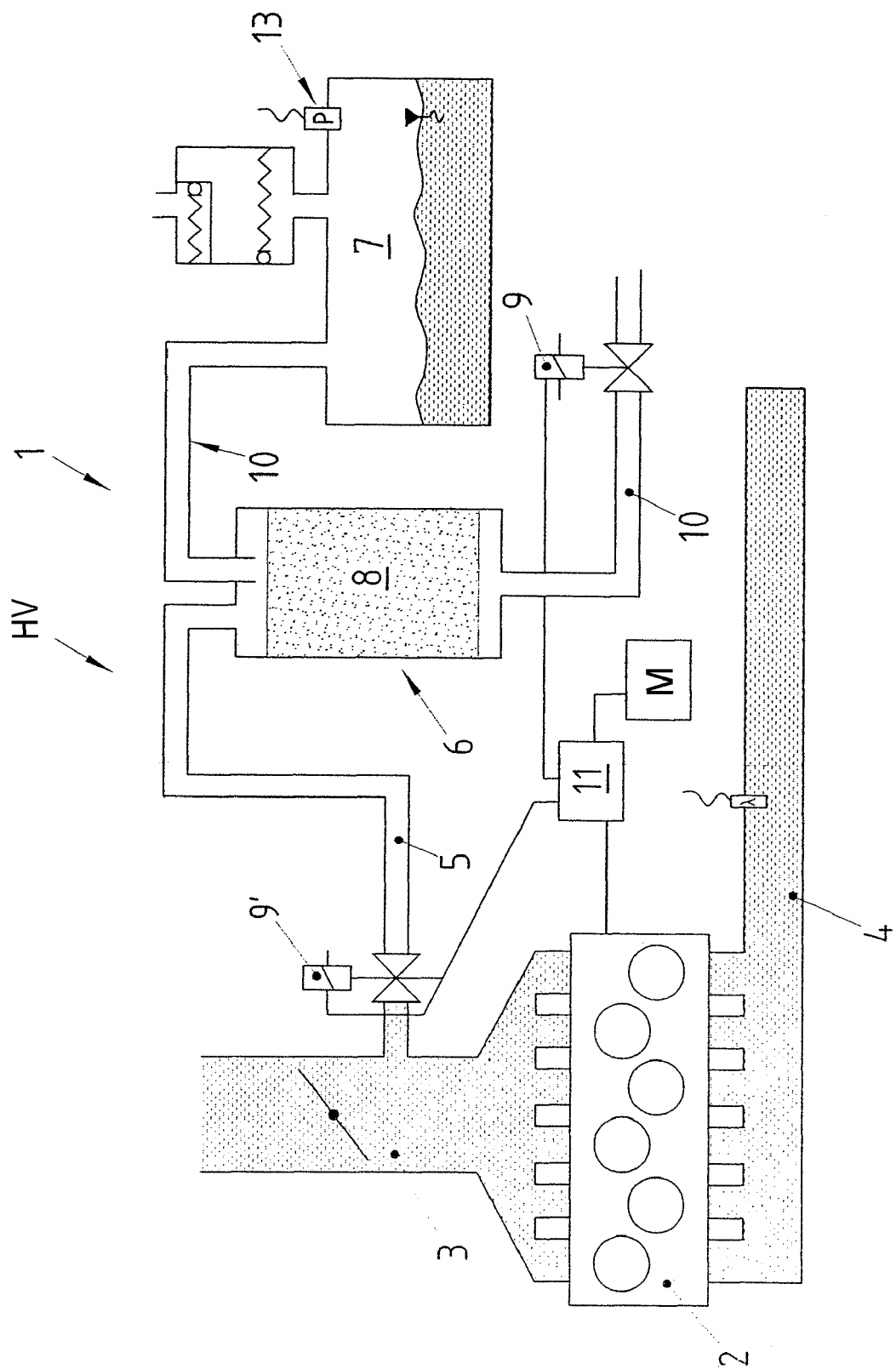
FIG. 1 is a schematic view of a standard construction of a tank ventilation system according to the invention.

Corresponding to FIG. 1, a hybrid drive 1 for a hybrid vehicle HV has an internal-combustion engine 2 as well as an electric motor M. The hybrid vehicle is preferably constructed as a full-hybrid vehicle, so that it can be operated purely by an internal-combustion engine as well as purely by an electric motor. The internal-combustion engine has an intake path 3 and is connected with an exhaust gas system 4. The intake path 3 feeds a fuel-air mixture to the internal-combustion engine 2, which fuel-air mixture is burnt in the internal-combustion engine 2. The combustion products subsequently leave the internal-combustion engine 2 and reach the environment by way of the exhaust system 4.

A suction pipe 5, which is connected with a filtering device 6 at the other end, leads into the intake path 3. The suction pipe 5 and the filtering device 6 are components of the tank ventilation system which, in addition, comprises a fuel tank 7. The filtering device 6 has a filtering material 8 that can be regenerated or flushed, and is arranged in a tank ventilation pipe 10 that leads from the fuel tank 7 into the environment and can be shut off by means of a valve device 9. An additional valve device 9' is arranged in the suction pipe 5 between the intake path 3 of the internal-combustion engine 2 and the filtering device 6.

Hydrocarbons that evaporate from the fuel arrive by way of the tank ventilation pipe 10 in the filtering device 6 and are prevented there by the filtering material 8, such as an activated carbon filter, from exiting into the environment. If the filtering material 8 is saturated by hydrocarbons, it must be flushed or regenerated. For this purpose a control device 11 actuates (that is, opens) the valve devices 9, 9' as needed, and thereby feeds ambient air through the filtering material 8 and the suction pipe 5 to the intake path 3. By flushing ambient air through the tank ventilation pipe 10 and the filtering material 8, the latter is regenerated and prepared for the renewed absorption of hydrocarbons evaporated from the fuel.

However, in the case of a hybrid drive 1, operating conditions may occur in which the internal-combustion engine 2 is switched off and the vehicle is driven only by the electric motor. In this operating condition, the filtering device 6 cannot be flushed because of the non-existing pressure difference from the intake path 3 to the filtering device 6, so that there is the risk that, if the filtering material 8 is completely saturated with hydrocarbons, the latter reach the environment by way of the tank ventilation pipe 10. This should definitely be prevented.

According to the invention, therefore, the control device 11 is constructed such that, during an electric operation of the hybrid vehicle, it connects the internal-combustion engine 2 as a function of a loading condition of the filtering device 6 and, as a result, the hydrocarbons flushed into the intake path 3 can be fed from the filtering material 8 to the combustion.

Figure 2:
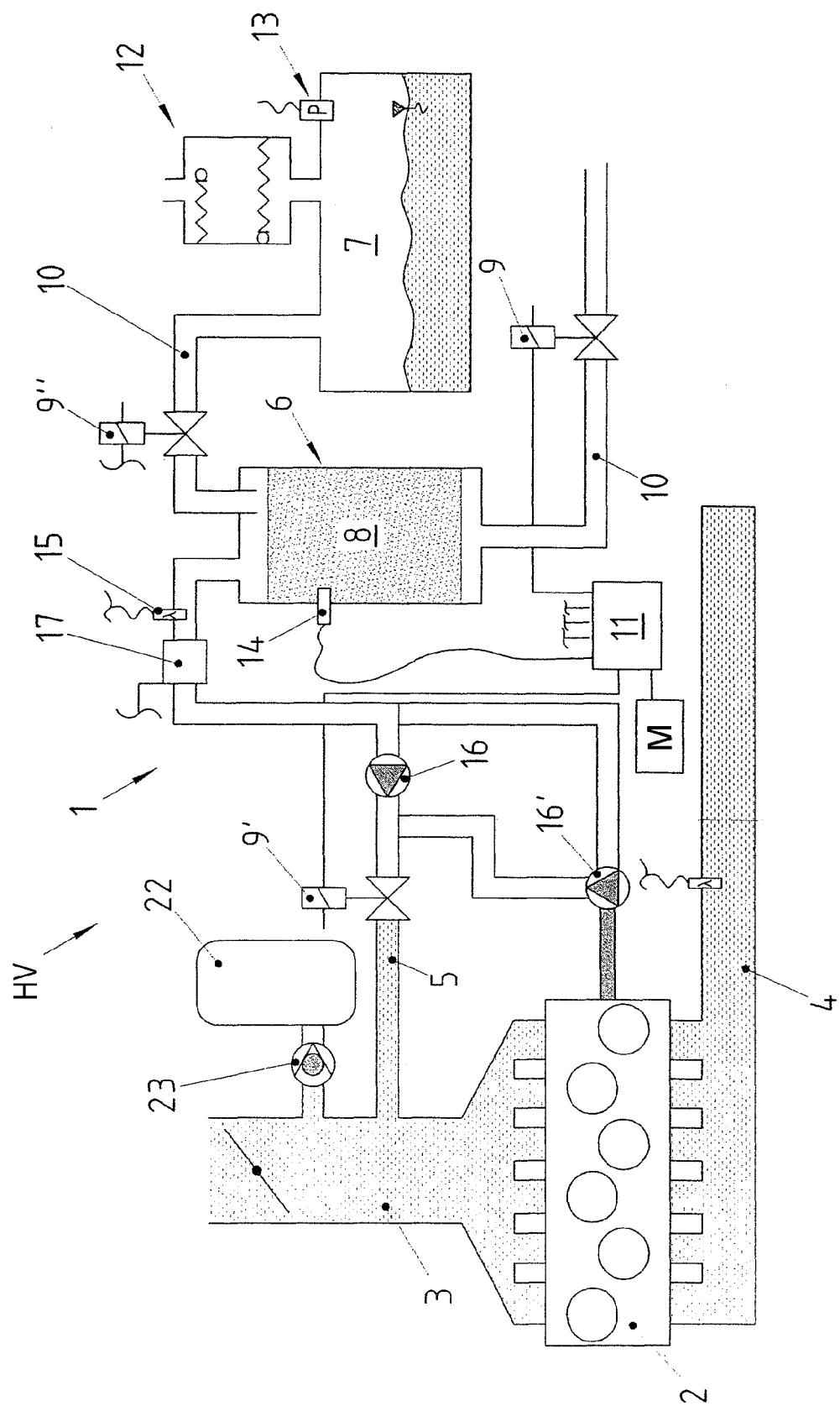
FIG. 2 is a schematic view of the representation of FIG. 1 but with several different and individually optionally usable components of the tank ventilation system.

Furthermore, other possibilities of reducing or avoiding a hydrocarbon emission into the environment are marked by the letters A to H in FIG. 2, these further developments being usable alternatively as well as cumulatively.

Further Development I

In the further development I, an additional valve device 9" is arranged between the filtering device 6 and the fuel tank 7 in the tank ventilation pipe 10, and a pumping device 12 is provided which can pressurize the fuel tank 7 when the valve device 9" is closed. Likewise, a sensor device 13 is provided which can detect at least a pressure in the fuel tank 7. By closing the valve device 9" and by pressurizing the fuel tank 7, the pressure rises in the latter, whereby a tendency of the fuel to evaporate (and thereby an evaporating of hydrocarbons from the fuel) is prevented or at least inhibited. The formation of gaseous hydrocarbons is thereby made difficult. In addition, the sensor device 13, can detect a time-dependent pressure loss which provides information on the tightness of the fuel tank 7 or of the pipes 10 communicating therewith. By increasing the pressure, the entry of gaseous hydrocarbons into the filtering device 6 is therefore reduced.

Further Development II

In order to be able to better detect a loading condition of the filtering device 6 or of the filtering material 8 with hydrocarbons, a filling level sensor 14 is provided which is connected with the control device 11.

Further Development III

The control device 11 can carry out a so-called priority control in which, for example, the internal-combustion engine is switched on when a high loading of the filtering material 8 with hydrocarbons is detected. Simultaneously, a desired flushing quantity control can be carried out and certain diagnostic operations can suppressed. For example, a lambda probe can determine a hydrocarbon fraction, from which information on a richness stage of a tank ventilation gas can be obtained. If the mixture is, for example, becoming richer, a diagnostic operation can be suppressed and the tank ventilation can be given priority.

Further Development IV

In order to increase, as required, the flushing quantity that is fed to the intake path 3 by way of the tank ventilation pipe 10, the filtering material 8 and the suction pipe 5, a pump 16 may be provided between the valve device 9' and the filtering device 6, which pump 16 generates a current flowing through the filtering device 6 and the intake path 3. This pump 16 may be constructed, for example, as an electric pump or as a pump 16' mechanically driven by the internal-combustion engine 2 by way of the crankshaft or the camshaft. By means of pump 16 and pump 16', the flushing quantity can be actively increased, in which case the use of a pump 16 constructed as a mechanical brake power vacuum pump on the internal-combustion engine 2 presents itself because this pump 16 is not needed or used in the case of a hybrid drive 1. This pump 16, 16' is also connected in communication with the control device 11. In particular, the pump 16, 16' permits a high flushing current in the case of high suction pipe pressures which exist in a high-load operation.

Further Development V

In the further development V, a hydrocarbon sensor 15 (for example, a lambda probe) for measuring an oxygen concentration can be arranged in the suction pipe 5 between the filtering device 6 and the valve device 9'. The hydrocarbon sensor 15 may also be constructed as a flame ionization detector and measures a hydrocarbon concentration in the flushing gas. Thereby, a reaction time for opening the valve device 9' is to be reduced. Because the flushing gas concentration is known, the opening of the valve 9' can be controlled more rapidly, because the effect of the flushing gas on the combustion mixture can be precomputed in the control device 11.

Further Development VI

In the further development VI, a measuring device 17 for measuring a mass flow rate, particularly for measuring a tank ventilation mass flow rate, is provided in the suction pipe 5 between the filtering device 6 and the valve device 9', the measuring device 17, for example, being constructed as a hot-film probe. In this case, the measuring device 17 is connected particularly with the pumps 16 or 16' and the control device 11.

Further Development VII

Figure 4:
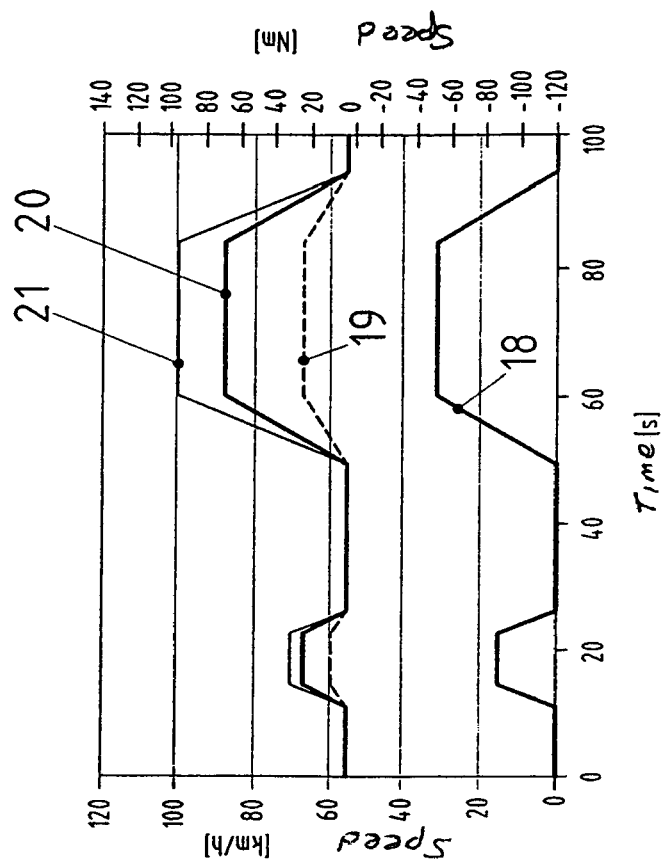
FIG. 4 is a schematic view of the representation in FIG. 3, but in the case of a tank ventilation condition.
Figure 3:
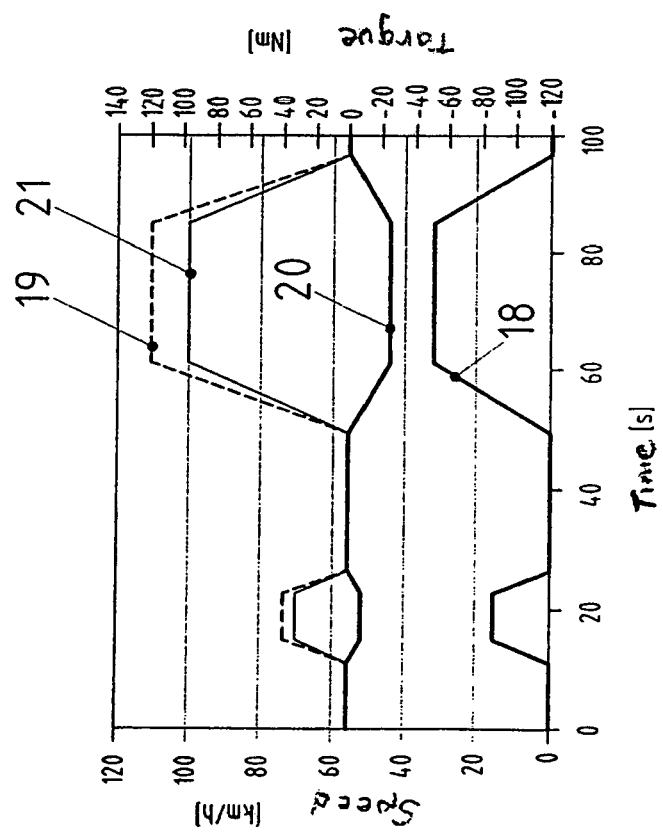
FIG. 3 is a schematic view of a torque and speed distribution of the hybrid drive according to the invention in a battery charging condition.

In FIGS. 3 and 4, the curve 18 represents a speed of the hybrid vehicle, Curves 19 and 20 respectively represent torque at the internal-combustion engine 2 and the electric motor (not shown), respectively. When, for example, a filling level sensor 14 detects high hydrocarbon loading of the filtering material 8, the torque required for driving the hybrid vehicle is displaced from the internal-combustion engine 2 toward the electric motor, so that the internal-combustion engine 2 runs with a low suction pipe pressure in the intake path 3 resulting in a high flushing difference. As illustrated in FIGS. 3 and 4, the cumulative torque remains unchanged at the transmission input.

FIG. 3 shows that the internal-combustion engine 2 generates the torque 19 required mainly for driving the hybrid vehicle. The torque 20 generated by the electric motor is negative, so that the latter can be utilized to charge a vehicle battery. The cumulative torque 21 occurs at approximately +100 Nm, in which case the internal-combustion engine 2 generates a torque 19 of approximately +120 Nm and the electric motor generates a torque 20 of approximately −20 Nm.

In contrast, the torque distribution between the electric motor and the internal-combustion engine 2 according to FIG. 4 is completely different: Here, the internal-combustion engine 2 generates a torque 19 of approximately.+25 Nm, and the electric motor generates a torque 20 of approximately +75 Nm. The cumulative torque 21 also results in +100 Nm, so that the speed 18 between the two conditions in FIGS. 3 and 4 does not change.

Further Development VIII

In the further development VIII, a vacuum accumulator 22 is provided in the intake path 3 of the internal-combustion engine 2, which vacuum accumulator 22, when the valve devices 9' and 9 are open, permits a flushing of the filtering device 6, even when the internal-combustion engine 2 is switched off. In this case, a non-return valve 23 for preventing an uncontrolled and unintended return current is arranged between the vacuum accumulator 22 and the intake path 3. The vacuum accumulator 22 generates the vacuum required for the flushing, which according to the other further developments, for example, further development D, is generated by the pumps 16 or 16'. As the only variant, the vacuum accumulator 22 permits a flushing of the filtering device 6 when the internal-combustion engine 2 is switched off Finally, it is pointed out again that the further developments I to VIII can be used cumulatively as well as alternatively, in which case, it makes sense to mutually combine the following farther developments: Further developments IV and VI, further developments V and III as well as further developments V and VII.

The foregoing disclosure has-been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid vehicle, comprising:
    an internal-combustion engine;
    an electric motor;
    a fuel tank;
    a tank ventilation pipe that leads from the fuel tank into the environment;
    a first valve device incorporated into the tank ventilation pipe for selectively opening or shutting off communication between the fuel tank and the environment;
    a filtering device that can be regenerated, the filtering device being arranged in the tank ventilation pipe between the fuel tank and the first valve device;
    a suction pipe leading from the filtering device to an intake path of the internal-combustion engine;
    a second valve device arranged in the suction pipe between the filtering device and the intake path;
    a control device constructed such that, for flushing the filtering device, the control device actuates the first and second valve devices whereby ambient air can be fed through the tank ventilation pipe, the filtering device and the suction pipe to the internal-combustion engine and, as a result, hydrocarbons present in the pipes and in the filtering device can be fed to the internal-combustion engine for combustion; and
    the control device is further constructed such that, in an electric operation of the hybrid vehicle, the control device switches on the internal-combustion engine as a function of a loading condition of the filtering device.

2. The hybrid vehicle comprising:
    an internal-combustion engine;
    an electric motor;
    a fuel tank;
    a tank ventilation pipe that leads from the fuel tank into the environment
    a first valve device incorporated into the tank ventilation pipe for selectively opening or shutting off communication between the fuel tank and the environment;
    a filtering device that can be regenerated, the filtering device being arranged in the tank ventilation pipe between the fuel tank and the first valve device;
    a suction pipe leading from the filtering device to an intake path of the internal-combustion engine;
    a second valve device arranged in the suction pipe between the filtering device and the intake path;
    a control device constructed such that, for flushing the filtering device, the control device actuates the first and second valve devices whereby ambient air can be fed through the tank ventilation pipe, the filtering device and the suction pipe to the internal-combustion engine and, as a result, hydrocarbons present in the pipes and in the filtering device can be fed to the internal-combustion engine for combustion; and
    the control device is further constructed such that, in an electric operation of the hybrid vehicle, the control device switches on the internal-combustion engine as a function of a loading condition of the filtering device.
    a vacuum accumulator is-provided in the intake path of the internal-combustion engine; and wherein when the first and second valve devices are open, the vacuum accumulator permits flushing of the filtering device when the internal-combustion engine is switched off.

3. The hybrid vehicle according to claim 1, further comprising:
a third valve device arranged in the tank ventilation pipe, between the filtering device and the fuel tank;
a pumping device provided to pressurize the fuel tank when the third valve device is closed; and
a sensor device provided to detect a pressure in the fuel tank.

4. The hybrid vehicle according to claim 1, further comprising a filling level sensor connected with the control device and which can detect a loading condition of the filtering device with hydrocarbons.

5. The hybrid vehicle according to claim 1, further comprising:
a pump provided between the second valve device and the filtering device which pump generates a current flowing through the filtering device and to the intake path; and
the pump comprises one of an electric pump and a pump which is mechanically driven by the internal-combustion engine.

6. The hybrid vehicle according to claim 1, further comprising a hydrocarbon sensor arranged in the suction pipe between the filtering device and the second valve device, for measuring hydrocarbon concentration.

7. The hybrid vehicle according to claim 6, wherein the hydrocarbon sensor comprises one of a lambda probe and a flame ionization detector.

8. The hybrid vehicle according to claim 1, further comprising a measuring device arranged in the suction pipe between the filtering device and the second valve device, for measuring a mass flow rate.

9. The hybrid vehicle according to claim 8, wherein the measuring device for measuring the mass flow rate comprises a hot-film probe.

10. A tank ventilation system for a hybrid vehicle having an internal combustion engine and an electric motor, said ventilation system comprising:
a fuel tank ventilation pipe;
a regenerable filter situated in the fuel tank ventilation pipe;
a suction pipe leading from the filtering device to an intake path of the internal combustion engine;
a valve situated in said suction pipe, between the filtering device and the intake path of the internal combustion engine;
a control unit that is configured to actuate the valve for regenerating the filter, whereby ambient air flows through the ventilation pipe, the filter and the suction pipe to the internal combustion engine, and hydrocarbons in the pipes and in the filter are flushed into the internal combustion engine; and
the control unit is further configured to start said internal combustion engine as a function of a loading condition of the filter, during electric operation of the hybrid vehicle.

11. The tank ventilation system according to claim 10, wherein said control unit causes said internal combustion engine to operate when the filter is being regenerated while the hybrid vehicle is driven by the electric motor.

12. The tank ventilation system for a hybrid vehicle according to claim 10, further comprising:
a vacuum accumulator provided in the intake path of the internal-combustion engine; and wherein
when the first and second valve devices are open, the vacuum accumulator permits flushing of the filtering device when the internal-combustion engine is switched off.

13. The tank ventilation system for a hybrid vehicle according to claim 10, further comprising:
a third valve device arranged in the tank ventilation pipe between the filtering device and the fuel tank;
a pumping device disposed to pressurize the fuel tank when the third valve device is closed; and
a sensor device disposed to detect a pressure in the fuel tank.

14. The tank ventilation system for a hybrid vehicle according to claim 10, further comprising a filling level sensor connected with the control device and configured to detect a loading condition of the filtering device with hydrocarbons.

15. The tank ventilation system for a hybrid vehicle according to claim 1, further comprising:
a pump provided between the second valve device and the filtering device which pump generates a current flowing through the filtering device and to the intake path; and
the pump comprises one of an electric pump and a pump which is mechanically driven by the internal-combustion engine.

16. The tank ventilation system for a hybrid vehicle according to claim 10, further comprising a hydrocarbon sensor arranged in the suction pipe between the filtering device and the second valve device for measuring hydrocarbon concentration.

17. The ventilation system for a hybrid vehicle according to claim 16, wherein the hydrocarbon sensor comprises one of a lambda probe and a flame ionization detector.

18. The ventilation system for a hybrid vehicle according to claim 17, further comprising a measuring device arranged in the suction pipe between the filtering device and the second valve device for measuring a mass flow rate.

19. The ventilation system for a hybrid vehicle according to claim 18, wherein the measuring device for measuring the mass flow rate comprises a hot-film probe.

* * * * *